United States Patent
Chapnerkar et al.

[11] Patent Number: 5,164,006
[45] Date of Patent: Nov. 17, 1992

[54] METHOD FOR PREPARING ACID RESISTANT CALCIUM CARBONATE PIGMENTS

[75] Inventors: Vasant D. Chapnerkar, Tampa, Fla.; Vicente B. Lasmarias, Tacoma; Vijay K. Mathur, Federal Way, both of Wash.

[73] Assignee: ECC America Inc., Atlanta, Ga.

[21] Appl. No.: 681,947

[22] Filed: Apr. 8, 1991

[51] Int. Cl.$^5$ .............................................. C09C 1/02
[52] U.S. Cl. .................................. 106/465; 106/431; 106/471; 106/481
[58] Field of Search ............... 106/465; 423/430, 32; 427/218, 219; 428/404

[56] References Cited

U.S. PATENT DOCUMENTS

| | | | |
|---|---|---|---|
| 2,259,481 | 10/1941 | Mowlds | 106/421 |
| 2,269,470 | 1/1942 | Mowlds | 106/431 |
| 2,928,802 | 3/1960 | Rehner et al. | 523/212 |
| 3,152,001 | 10/1964 | Podschus et al. | 106/464 |
| 3,290,165 | 12/1966 | Iannicelli | 106/475 |
| 3,373,134 | 3/1968 | Yasui et al. | 524/426 |
| 4,167,423 | 9/1979 | Williams | 106/431 |
| 5,000,791 | 3/1991 | Tokarz et al. | 106/465 |

FOREIGN PATENT DOCUMENTS

0364406A1 2/1990 European Pat. Off.

Primary Examiner—William R. Dixon, Jr.
Assistant Examiner—Margaret V. Einsmann
Attorney, Agent, or Firm—Klauber & Jackson

[57] ABSTRACT

A method for preparing an acid resistant calcium carbonate pigment. An aqueous slurry of particulate calcium carbonate is provided at a pH of from about 11.0 to 12.0 and having from 2 to 5 g/l of excess calcium hydroxide. The slurry temperature is brought to the range of about 75° to 80° C., and sodium silicate solution is slowly mixed therewith to provide on a solid dry weight ratio from about 5 to 10% sodium silicate to calcium carbonate. Gaseous carbon dioxide is added to bring the slurry pH to the range of about 10.2 to 10.7, and the slurry is cooled to about 25° to 30° C. Finally zinc chloride is added to the cooled slurry to bring the pH to within the range of 7.5 to 8.0.

12 Claims, 1 Drawing Sheet

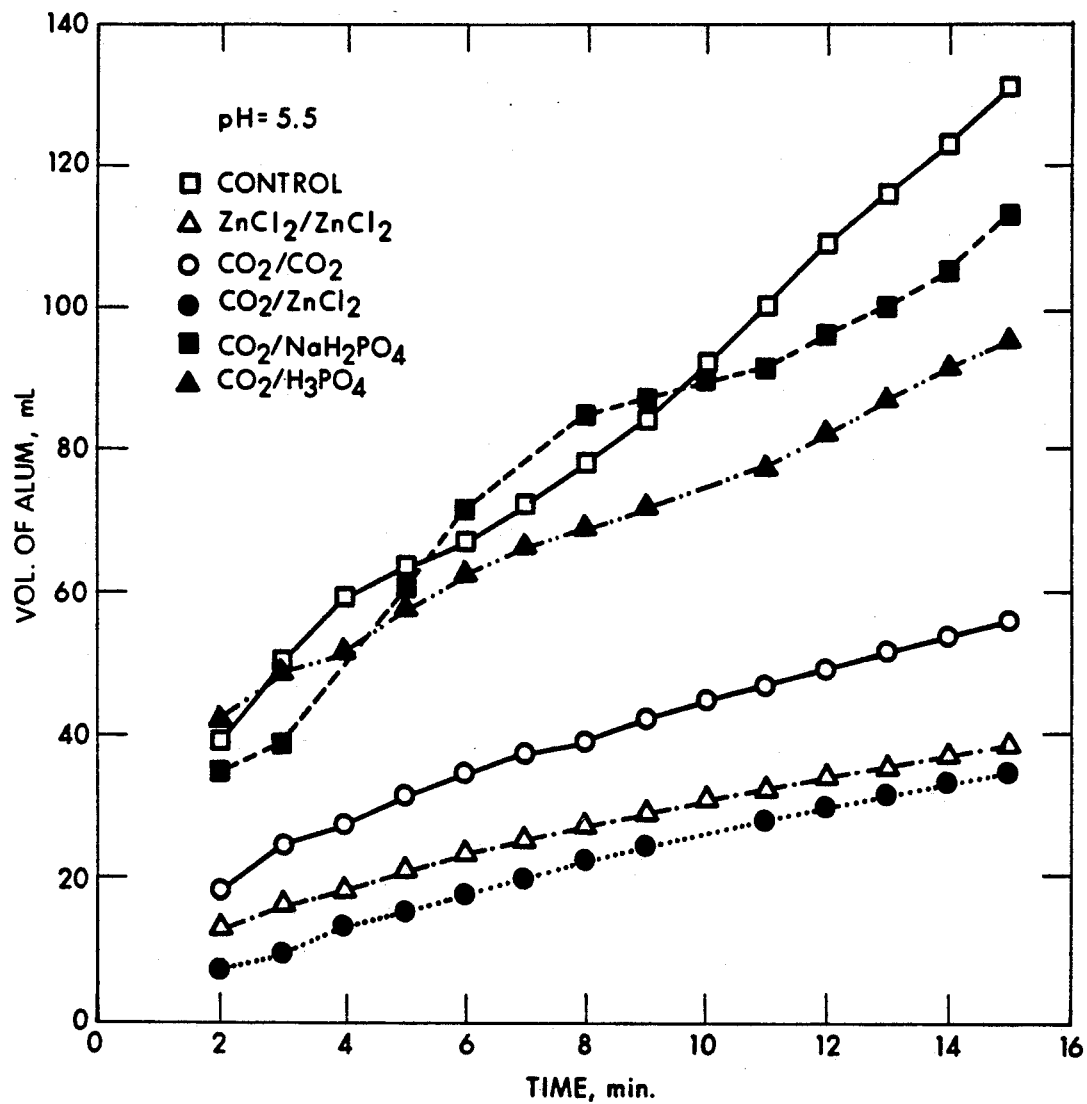

METHOD FOR PREPARING ACID RESISTANT CALCIUM CARBONATE PIGMENTS

BACKGROUND OF INVENTION

This invention relates generally to calcium carbonate pigments for use in papermaking, and more specifically relates to a calcium carbonate pigment having acid resistant properties.

Calcium carbonate pigments have found increasing application as fillers (and also as coating pigments) in the production of paper and paperboard products. This utility arises by virtue of their excellent optical and physical properties when used for such purposes. In general, however, such calcium carbonate pigments have principally been utilized in papermaking operations based upon neutral or alkaline chemistry. Papermaking operations based upon use of ground wood, however, normally are conducted at an acid pH, and under these conditions calcium carbonate cannot normally be used because of its ready reactability.

It has heretofore been recognized that such calcium carbonate pigments, including especially precipitated calcium carbonates ("PCC's"), i.e. carbonates commonly produced by reaction of a slurry of calcium hydroxide with gaseous carbon dioxide, may by several known techniques be provided with a protective surface coating, rendering the pigments acid resistant. Several such techniques have been based upon precipitation of silica or a metal silicate upon the surface of the calcium carbonate pigment. One way in which this can be accomplished is by reacting water glass (sodium silicate solution) with sulfuric acid, so that the silica will precipitate on the particulate calcium carbonate pigments present in the reaction slurry. However, evaluation of this technique has shown that the resultant modified calcium carbonates, e.g. surface modified PCC's, have only quite limited resistance to acidity.

In another known process a PCC slurry is intermixed with sodium silicate solution, and then the latter is subjected to a two-step carbonation with gaseous carbon dioxide, namely to a first carbonation step at approximately 80° C. and then (following cooling of the slurry to around 25° C.) to a second carbonation step with gaseous $CO_2$. This results in precipitation of silica as aforementioned.

More recently, in European application No. 89650222.4 (publication number 0356406), the applicants Tokarz et al. describe a process wherein a previously prepared PCC slurry is intermixed with a solution of a zinc compound and a solution of a silicate-containing substance. According to the invention, a slurry of $CaCO_3$ filler particles is mixed simultaneously with a solution of a zinc compound and a solution of a silica-containing substance which preferably is sodium water glass. The zinc compound preferably is zinc chloride or zinc oxide. The two solutions are added at a temperature of 70°-95° C., preferably 85°-90° C. especially preferred 90° C. Furthermore, the addition is carried out pH 8-11, preferably 9-10, especially preferred 9.2-9.4. The added amounts of coating agent, i.e. of a silica-containing substance, preferably water glass, and of a zinc compound, preferably zinc chloride, are 300-400 parts by weight $SiO_2$ and 40-60 parts by weight Zn. The $SiO_2$:Zn ratio is 7.5:1 to 6.6:1, which corresponds to pH 8-11.

The product provided from this process has excellent acid resistant properties. However, it may be noted that as a practical matter the use of zinc chloride or zinc oxide is a very costly and inefficient way to produce the said product. Thus the commercial attractiveness of such a process is limited by its costs.

Parenthetically it may be noted that the broad concept of treating inorganic mineral products, including calcium carbonates, with a metal silicate has been previously known in the art as shown, for example, in Williams, U.S. Pat. No. 4,167,423. Example III of that patent, by way of illustration, shows preparation of a calcium silicate treated carbonate filler by reaction of hydrochloric acid with a sodium metasilicate nonhydrate. In other Examples of Williams, different water soluble salts were employed including zinc chloride. Williams' objective is actually to produce a product which is silane reactive. It will be appreciated that the method of Williams is not used in conjunction with a carbonation process as is commonly practiced in the preparation of especially PCC's, and teachings such as those of Williams fail to recognize the critical conditions that are necessary to produce acid resistant calcium carbonate pigments, including in a directly usable slurry form.

OBJECTS OF THE INVENTION

In accordance with the foregoing, it may be regarded as an object of the present invention to provide a method for preparing an acid resistant calcium carbonate pigment.

It is a further object of the invention to provide a method for preparing an acid resistant calcium carbonate pigment, which is particularly applicable to precipitated calcium carbonate pigments and to methods involving the production of same.

It is a further object of the invention to provide a method of the foregoing character, which produces pigments having excellent acid resistant properties, equalling or surpassing those of previously known such pigments.

A still further object of the invention is to provide a method of the foregoing character which is simple to carry out and which utilizes low-cost, readily available reactants.

SUMMARY OF THE INVENTION

Now in accordance with the present invention, the foregoing objects and others as will be apparent in the course of the ensuing specification, are achieved in a method wherein an aqueous slurry of particulate calcium carbonate is provided at a pH of from about 11.0 to 12.0, the slurry containing from 2 to 5 g/l of excess calcium hydroxide. The slurry temperature is brought to the range of about 75° to 80° C., and a sodium silicate solution is slowly added with thorough mixing, and in sufficient quantities to provide on a solid dry weight ratio from about 5 to 10% sodium silicate to calcium carbonate. Gaseous carbon dioxide is added to bring the slurry pH to the range of about 10.2 to 10.7. The slurry is then cooled to 20° to 35° C. and zinc chloride is added to bring the pH to within the range of 7.5 to 8.0. As a result the particulate calcium carbonate is then found to be surface modified by a precipitated silicate and to possess excellent resistance to acid conditions. The slurry containing the pigment has good rheology and may be directly utilized in acid-based papermaking; or the calcium carbonate pigment can be filtered from the slurry and dried for use in filler and other applications.

The initial slurry may comprise a ground natural calcium carbonate which is present therein as from about 20 to about 40 by weight % of the slurry. Other particulate forms of calcium carbonate can also be used in the initial slurry, such as natural chalks. Preferably, however, the slurry comprises a precipitated calcium carbonate, which is prepared by carbonating an aqueous calcium hydroxide slurry to an end point within the pH range of 11.0 to 12.0.

The zinc chloride is added in the range of from about 1.8 to 2.1% by weight of dry calcium carbonate. The precipitated calcium carbonate is preferably present in the slurry as from about 10 to 30% solids by weight, and more preferably a from 15 to 20% by weight.

BRIEF DESCRIPTION OF DRAWING

In the drawing herein:

The FIGURE is a graph showing the results of a series of acidification tests conducted on PCC samples produced in accordance with the invention and with the prior art.

DESCRIPTION OF PREFERRED EMBODIMENT

In the general mode of practicing the invention, an aqueous slurry of a particulate calcium carbonate is prepared, which has a pH of from about 11.0 to 12.0, and which contains from about 2 to 5 g/l of excess, i.e. unreacted calcium hydroxide. Preferably the pH is 11.5 or above—i.e. from 11.5 to 12.0. Where the calcium carbonate is the preferred precipitated form of same, this result may be brought about by reacting a slurry of calcium hydroxide with gaseous $CO_2$ which is bubbled therethrough in the conventional manner, except that the addition of $CO_2$ is halted when the pH reaches the range of 11.0 to 12.0, and preferably the higher end of this range, i.e. about 11.5 or above. This will correspond to an excess of about 2 to 5 g/l of calcium hydroxide.

In the event a ground calcium carbonate is used, i.e. one derived from natural calcitic ores, or the like, such slurries commonly have a pH when dispersed without adjustments of about 9 to 9.5. In this instance, again, calcium hydroxide is added (e.g. as calcium oxide) to achieve the desired pH of 11 to 12.0 and the corresponding excess (i.e. of unreacted) calcium hydroxide.

The slurry is now heated to about 80° C. (more generally from about 75° to 80° C.) and then a sodium silicate solution, i.e. a solution of $Na_2SiO_3$ is slowly added with vigorous mixing. The amount utilized is such as to provide from about 5 to 10% by weight of dry silicate in ratio to the dry calcium carbonate. The resulting slurry is now subjected to a two stage carbonation. In the initial or first stage, carbon dioxide is bubbled through the slurry to bring the slurry pH to the range of about 10.2 to 10.7 and preferably to a pH of from 10.4 to 10.6. The slurry is then cooled to about 20° to 35° C., preferably to about 25° to 30° C., whereupon zinc chloride is added to the cooled slurry until the pH of same is brought to the range of 7.5 to 8.0. This addition range for the zinc chloride corresponds to about 1.8 to 2.1% by weight of dry calcium carbonate. The resulting slurry is found to contain the calcium carbonate, e.g. the PCC, in a highly acid resistant form, and also to have good rheological properties. When the material is subjected to acid testing, i.e. to determine the effects of acidity upon the resulting carbonates they are found to be highly acid resistant, and therefore to be highly usable in acid-based papermaking operations pertinent to manufacture of ground wood-containing papers.

The invention will be further illustrated by the following Examples, which are to be considered illustrative of the invention, and not delimitive of same:

EXAMPLE I

In this Example a 17% by weight calcium hydroxide aqueous slurry was treated initially with $CO_2$ to form a PCC slurry, with the carbon dioxide addition being discontinued as to yield different pH's in the PCC slurry. The resulting slurries were then treated as aforementioned, i.e. heated to 80° C., thoroughly mixed with 10% by weight sodium silicate, and then reacted in both first and second stages with carbon dioxide. The temperature in the first stage was 80° C. and in the second stage 25° C. Table 1 shows the results on the slurry of these conditions. The final pH after the second stage is shown, and it will be seen that where the PCC slurry is provided with a pH of 11.1 the final resultant slurry is quite fluid, whereas undesired gelling occurs when the pH is substantially more acidic. This illustrates the criticality of the starting pH in the PCC slurry.

TABLE 1

| | Effect of PCC Slurry Starting pH | | |
|---|---|---|---|
| Batch ID No. | Starting pH (PCC Slurry) | Final pH (After 2nd Stage) | Remarks |
| *SILC 02 | 11.1 | 8.0 | fluid |
| SILC 11 | 8.2 | 7.6 | gelled |
| *SILC 12 | 11.1 | 7.5 | fluid |
| SILC 21.1 | 9.2 | 7.6 | gelled |

Conditions:
Reaction temperature (silica addition and 1st stage): 80° C.;
Amount of silica added: 10% (o.d. wt. PCC, basis);
$CO_2$ in 1st and 2nd stages;
Temperature in 2nd stage: 25° C.
*Data on original PCC slurry:
pH = 11.1
Blaine surface area (PCC) = 27,000 $cm^2/g$
Concentration = 17% solids (PCC)

EXAMPLE II

Further experiments of the type described in connection with Example I were conducted, utilizing different additional levels of sodium silicate, and different temperature ranges in the first and second carbonation stage. It is seen that when temperatures as low as 70° C. are used at the first stage, gelling occurs.

TABLE 2

| | Effect of Temperature During $CO_2$ Addition | | | | |
|---|---|---|---|---|---|
| Batch ID No. | % $Na_2SiO_3$ | 1st Stage T | 2nd Stage T | Final pH | Remarks |
| SILC 01 | 5 | 80 | 25 | 8.0 | fluid |
| SILC 07 | 5 | 25 | 25 | 8.0 | gelled |
| SILC 02 | 10 | 80 | 25 | 7.9 | fluid |
| SILC 21 | 10 | 70 | 25 | 7.8 | gelled |
| SILC 09 | 10 | 25 | 25 | 7.9 | gelled |

Conditions:
$CO_2$ flow rate: 0.5 l/min
Quantity of $Na_2SiO_3$: based on o.d. PCC
Data on original PCC slurry:
pH = 11.1
Blaine surface area (PCC) = 27,000 $cm^2/g$
Concentration = 17% solids (PCC)

EXAMPLE III

The purpose of the silicate coating achieved by the present invention is to retard the attack of acid during the papermaking operation. This coating needs to be as complete as required. In order to determine how much coating needs to be applied without gelling, experiments were conducted with different amounts of silicate coating. The data set forth in Table 3 clearly indicates that beyond the level of about 10% silicate coating stage and zinc chloride is used in the second stage, i.e. in accordance with the present invention.

TABLE 4

Effect of silica precipitating agents

| Batch ID No. | Precipitating Agent 1st | Precipitating Agent 2nd | pH 1st | pH 2nd | % Silicate Coating | % Solids | Flow Ability | Final Product Vol. of Alum* |
|---|---|---|---|---|---|---|---|---|
| CONTROL | — | — | — | — | 0 | — | fluid | 130.0 |
| SILC-26 | $CO_2$ | $CO_2$ | 8.9 | 7.8 | 4.6 | 20.8 | fluid | 54.6 |
| SILC-27-1 | $CO_2$ | $ZnCl_2$ | 8.9 | 7.8 | 3.5 | 19.7 | fluid | 33.3 |
| SILC-25 | $ZnCl_2$ | $ZnCl_2$[1] | 9.3 | 8.0 | 2.8 | 19.0 | fluid | 37.0 |
| SILC-27-2 | $CO_2$ | $NaH_2PO_4$ | 8.9 | 7.7 | 2.6 | 18.8 | fluid | 112.0 |
| SILC-28 | $CO_2$ | $H_3PO_4$ | 8.8 | 7.7 | 5.1 | 22.3 | fluid | 94.1 |
| SILC-29 | $H_3PO_4$ | $H_3PO_4$ | 8.8 | 7.8 | ND | ND/gelled | gelled | ND |

Conditions:
Reaction T (during silica addition and 1st stage): 90° C.
Silica added (o.d. PCC, basis): 10%
$CO_2$ flow rate: 0.3 l/min
Data on original PCC slurry:
pH = 11.6
Blaine = 34,000 cm²/g
Solids = 15.4%
Residual $Ca(OH)_2$ = 3.0 g/l
Vol. of alum consumed = 130 ml
*Vol. of alum (10% solution) consumed by 4% PCC slurry (10 g in 250 ml) in 15 min at pH of 5.5
[1]Total quantity of $ZnCl_2$ used (o.d. PCC, basis) = 7% there is a problem with gelling.

TABLE 3

Effect of Silica

| Batch ID No. | % $Na_2SiO_3$* | pH after $CO_2$ (1st stage) | pH after $CO_2$ (2nd stage) | Remarks (Flowability of Product) |
|---|---|---|---|---|
| SILC-01 | 5 | 10.7 | 8.0 | very fluid |
| SILC-02 | 10 | 10.7 | 8.0 | fluid |
| SILC-03 | 15 | 10.6 | 8.0 | viscous, almost gelled |
| SILC-04 | 20 | 10.6 | 8.0 | gelled |

Conditions:
Reaction T during silica addition and $CO_2$, 1st stage: 80° C.
$CO_2$ flow rate: 0.5 l/min
T at 2nd stage: 25° C.
Data on original PCC slurry:
pH = 11.1
Blaine surface area (PCC) = 27,000 cm²/g
Concentration = 17% solids (PCC)
*Based on o.d. wt. of PCC

EXAMPLE IV

A series of further experiments were conducted to determine how effective a particular coating was. This was carried out by means of an alum acidification test. This test involved determining the volume of alum (10% solution) consumed by 4% slurry (10 grams in 250 ml) in 15 minutes at a pH of 5.5. Table 4 shows the effectiveness of using different acidifying agents for silicate precipitation. When no coating was applied, i.e. as a control, alum consumption by the PCC was 130 ml. The initial experiments done using carbon dioxide in the first and second stages (Example I) show the reduction of alum consumption to 54.6—quite a significant drop. The use of carbon dioxide in the first stage and zinc chloride in the second stage (in accordance with the invention) shows the most effective coating and the least use of alum. Use of zinc chloride in both stages was next in effectiveness. The poorest results were observed when phosphoric acid was used in both stages.

This acidification test data is plotted in FIG. 1 showing volume of alum in ml used versus time in minutes. This illustrates that the poorest coating produced is when phosphoric acid is used, and the best coating produced is when carbon dioxide is used in the first While the present invention has been set forth in terms of specific embodiments thereof, it will be understood in view of the instant disclosure, that numerous variations upon the invention are now enabled to those skilled in the art, which variations yet reside within the scope of the present teachings. Accordingly the invention is to be broadly construed, and limited only by the scope and spirit of the claims now appended hereto.

What is claimed is:

1. A method for preparing an acid resistant calcium carbonate pigment, comprising the steps of:
   (a) preparing an aqueous slurry of particulate calcium carbonate at a pH of from about 11.0 to 12.0 and having from 2 to 5 g/l of excess calcium hydroxide in the slurry;
   (b) bringing the slurry temperature to the range of about 75° to 80° C.;
   (c) slowly adding with mixing sodium silicate solution to provide on a solid dry weight ratio from about 5 to 10% sodium silicate to calcium carbonate;
   (d) adding gaseous carbon dioxide to bring the slurry pH to the range of about 10.2 to 10.7.
   (e) cooling the slurry to between about 20° to 35° C.; and
   (f) adding zinc chloride to said cooled slurry to bring the pH to within the range of 7.5 to 8.0.

2. A method in accordance with claim 1 wherein the slurry of step (a) comprises a precipitated calcium carbonate and is prepared by carbonating an aqueous calcium hydroxide slurry to an end point within said pH range of from 11.0 to 12.0.

3. A method in accordance with claim 1 wherein said slurry comprises a ground calcium carbonate which is present therein as from about 20 to about 40% solids by weight of the slurry.

4. A method in accordance with claim 2, wherein said zinc chloride is added in the range of from 1.8 to 2.1% by weight of dry calcium carbonate.

5. A method in accordance with claim 2, wherein in step (a) the pH at said end point is 11.5 or higher, and in step (d) the pH is brought to the range of from about 10.4 to 10.6.

6. A method in accordance with claim 5, wherein in step (e) the slurry is cooled to 25° to 30° C.

7. A method in accordance with claim 2, wherein said precipitated calcium carbonate is present in said slurry as from about 10 to 30% solids by weight.

8. A method in accordance with claim 7, wherein said calcium carbonate is present as from 15 to 20% by weight.

9. A method for preparing an acid resistant precipitated calcium carbonate pigment, comprising the steps of:
   (a) carbonating an aqueous calcium hydroxide slurry to an end point whereat the slurry pH is from about 11.5 to 12.0;
   (b) bringing the slurry temperature to a range of 75° to 80° C.;
   (c) slowly adding with mixing a sodium silicate solution in amounts to provide from about 5 to 10% by weight dry silicate to dry calcium carbonate;
   (d) adding gaseous carbon dioxide to bring the slurry pH to the range of 10.4 to 10.6;
   (e) cooling the slurry to about 25° to 30° C.; and
   (f) adding zinc chloride to the said cooled slurry to bring the pH to within the range of 7.5 to 8.0.

10. A method in accordance with claim 9, wherein in step (a) the slurry at said end point includes from 2 to 5 g/l of unreacted calcium hydroxide.

11. An acid resistant calcium carbonate pigment for use in papermaking, prepared by the process of claim 1, and wherein the quantity of zinc chloride added in said process is in the range of from 1.8 to 2.1% by weight of dry calcium carbonate.

12. An acid resistant calcium carbonate pigment for use in papermaking, prepared by the process of claim 9, and wherein the quantity of zinc chloride added in said process is in the range of from 1.8 to 2.1% by weight of dry calcium carbonate.

* * * * *